(12) United States Patent
Gaastra

(10) Patent No.: US 6,327,469 B1
(45) Date of Patent: Dec. 4, 2001

(54) CHANNEL SCANNING METHOD AND APPARATUS

(75) Inventor: Lyle A. Gaastra, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/210,319

(22) Filed: Dec. 11, 1998

(51) Int. Cl.[7] .................................................. H04Q 7/20
(52) U.S. Cl. ........................... 455/436; 455/450; 455/527
(58) Field of Search .................................. 455/515, 434, 455/512, 513, 525, 437, 450, 552, 553, 527

(56) References Cited

U.S. PATENT DOCUMENTS

| 4,881,271 | | 11/1989 | Yamauchi et al. . | |
|---|---|---|---|---|
| 5,390,216 | | 2/1995 | Bilitza et al. . | |
| 5,392,331 | | 2/1995 | Patsiokas et al. . | |
| 5,507,034 | * | 4/1996 | Bodin et al. | 455/436 |
| 5,537,434 | * | 7/1996 | Persson et al. | 375/202 |
| 5,594,943 | | 1/1997 | Balachandran . | |
| 5,636,219 | | 6/1997 | Tanaka et al. . | |
| 5,697,055 | * | 12/1997 | Gilbousen et al. | 455/439 |
| 5,794,157 | * | 8/1998 | Haartsen | 455/426 |
| 5,883,888 | * | 3/1999 | St-Pierre | 455/436 |
| 5,940,380 | * | 8/1999 | Poon et al. | 455/436 |
| 5,995,834 | * | 11/1999 | Moore | 455/434 |
| 6,041,238 | * | 3/2000 | Tanoue | 455/513 |
| 6,108,322 | * | 8/2000 | Kotzin et al. | 455/436 |
| 6,108,542 | * | 8/2000 | Swanchara et al. | 455/434 |
| 6,122,511 | * | 9/2000 | Ozluturk | 455/437 |

FOREIGN PATENT DOCUMENTS

0779002B1    9/1998  (EP) .

* cited by examiner

Primary Examiner—William Trost
Assistant Examiner—Tilahun Gesesse
(74) Attorney, Agent, or Firm—Sylvia Y. Chen; Michael C. Soldner

(57) ABSTRACT

The channel scanning method and apparatus uses a priority table (500) to determine the action that should be taken by a mobile station (MS) during an idle frame of a traffic channel (TCH) in order to decode the base station identification code (BSIC) of each channel in a reporting table every ten seconds in accordance with GSM specification 05.08. The priority table (500) has channel groups (510, 520, 530, 540, 550, 560) based on the role of the cell relative to the MS, the time elapsed since the cell's broadcast channel (BCH) was most recently synchronized, the expected amount of time needed to either detect a frequency burst (FCH) or demodulate a synchronization burst (SCH), the power level of a BCH, and the detected noise level. The priority table is used by a scheduler (600) to aid the MS in efficiently using each idle frame and reducing nonuse of idle frames.

19 Claims, 3 Drawing Sheets

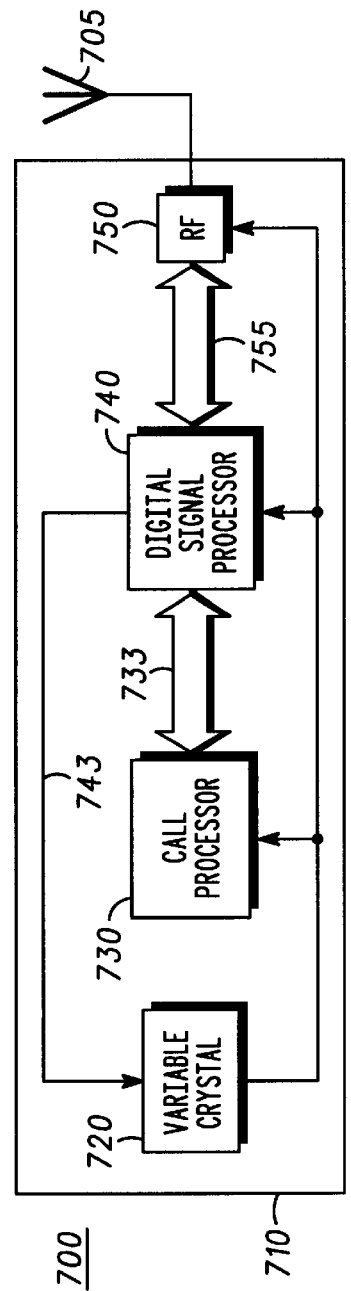

CHANNEL SCANNING METHOD AND APPARATUS

FIELD OF THE INVENTION

This invention relates generally to methods for synchronizing a cellular telephone mobile station (MS) with its serving cell base station and neighbor cell base stations to facilitate hand-over decisions in a cellular radiotelephone network.

BACKGROUND OF THE INVENTION

In a cellular radiotelephone system, the area served by the system is divided into geographically-defined cells. Each cell has a base station which serves MSs within its geographic area. An MS is linked to its serving cell base station, and it must also identify multiple neighbor cell base stations in order to facilitate reliable handover if the MS travels outside of the geographic range of its present serving cell.

FIG. 1 shows part of a cellular radiotelephone system that uses a seven-cell cell cluster. A different number of cells can be implemented in a cell cluster, and seven is merely chosen for explanation purposes. An MS 190 in cell 110 should be linked to the base station 180 in cell 110, thus the cell 110 is the MS 190 serving cell, and the serving cell base station should include surrounding cells 120, 130, 140, 150, 160, 170 in the serving cell's broadcast channel (BCH) allocation list. According to Global System for Mobile Communications (GSM) specifications, a BCH allocation list can include the BCH frequencies of up to thirty-two neighbor cells. The MS measures the power of each channel in the BCH allocation list and reports on up to six neighbor cells to the serving cell base station in a reporting table. Normally, these six channels in the reporting table are the six strongest channels from the BCH allocation list.

The GSM specifications for a digital radiotelephone system require that an MS decode the base station identification code (BSIC) of each channel in the reporting table at least once every ten seconds. An MS must complete two basic steps to decode a BSIC: (1) detect a frequency burst or frequency correction channel (FCH) on a cell's BCH to synchronize with the base station in the frequency domain (and pre-synchronize with the base station in the time domain); and (2) demodulate the synchronization burst or synchronization channel (SCH) of the cell's BCH to synchronize with the base station in the time domain. After the SCH has been demodulated, the mobile is fully synchronized to the base station and the BSIC is decoded.

FIG. 2 shows a BCH multiframe 200 according to GSM specifications. A BCH is broadcast by each base station and uses a repeating 51-frame structure with an FCH 210 occurring during frame numbers 0, 10, 20, 30, and 40 as shown. An SCH 220 occurs during frame numbers 1, 11, 21, 31, and 41 in a BCH multiframe 200 as shown in FIG. 2.

FIG. 3 shows a traffic channel (TCH) multiframe 300 according to GSM specifications. An MS uses a TCH to transmit user data, such as speech or computer data, to its serving cell base station. A TCH uses a repeating 26-frame structure with one idle frame 310 as the last frame in each TCH multiframe 300. The MS can detect an FCH, or demodulate an SCH, on a cell's BCH during the idle frame of a TCH multiframe 300.

FIG. 4 shows whether an idle frame of a TCH multiframe will intersect with an FCH, or an SCH, of a cell's BCH multiframe. Starting from frame 0 of the BCH multiframe 200 shown in FIG. 2 being aligned with frame 0 of the TCH multiframe 300 shown in FIG. 3, the idle frame 310 will first align with frame 25 of the BCH multiframe 200. Next, frame 0 of the TCH multiframe 300 aligns with frame 26 of the BCH multiframe 200, and the idle frame 310 will next align with the FCH 210 in frame 0 of the next BCH multiframe. This FCH is shown as FCH 410 in FIG. 4. The next idle frame aligns with a frame 26 of the BCH multiframe, and the fourth idle frame aligns with SCH 220 in frame 1 of the third BCH multiframe 200. This SCH is shown as SCH 420 in FIG. 4. The next six idle frames do not encounter either on FCH or an SCH. The alignment of the idle frames continues as shown in FIG. 4. As seen from FIG. 4, the worst case scenario for detecting an FCH burst on a cell's BCH can take up eleven idle frames. In other words, in the worst case scenario, ten idle frames are wasted. Thus, there is an opportunity to use unused frames in a more efficient manner to synchronize to a cell's base station.

BRIEF DESCRIPTION OF THE DRAWINGS

FIG. 2 shows a broadcast channel (BCH) multiframe according to GSM specifications.

FIG. 3 shows a traffic channel (TCH) multiframe according to GSM specifications.

FIG. 4 shows whether an idle frame of a TCH multiframe will intersect with a frequency burst (FCH), or a synchronization burst (SCH), of a cell's BCH multiframe.

FIG. 7 shows a simplified hardware block diagram of a cellular radiotelephone or MS according to a preferred embodiment.

DETAILED DESCRIPTION OF THE PREFERRED EMBODIMENTS

Figure 5:
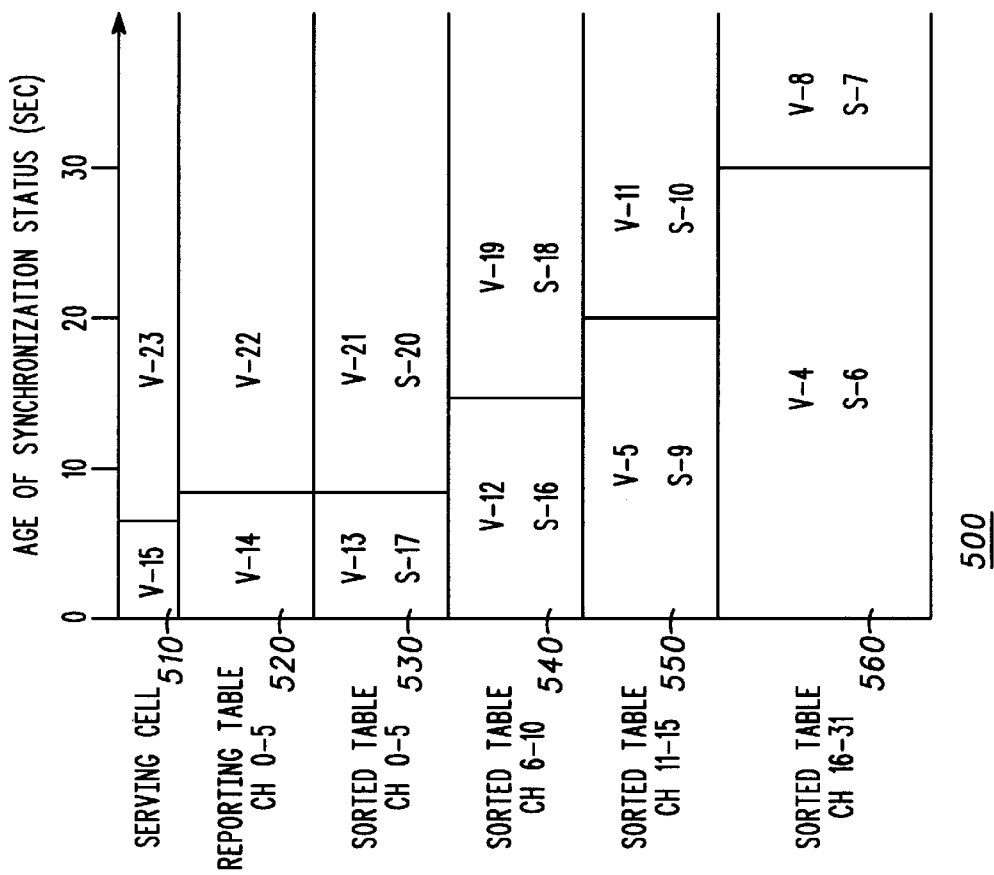
FIG. 5 shows a priority table according to a preferred embodiment.
Figure 1:
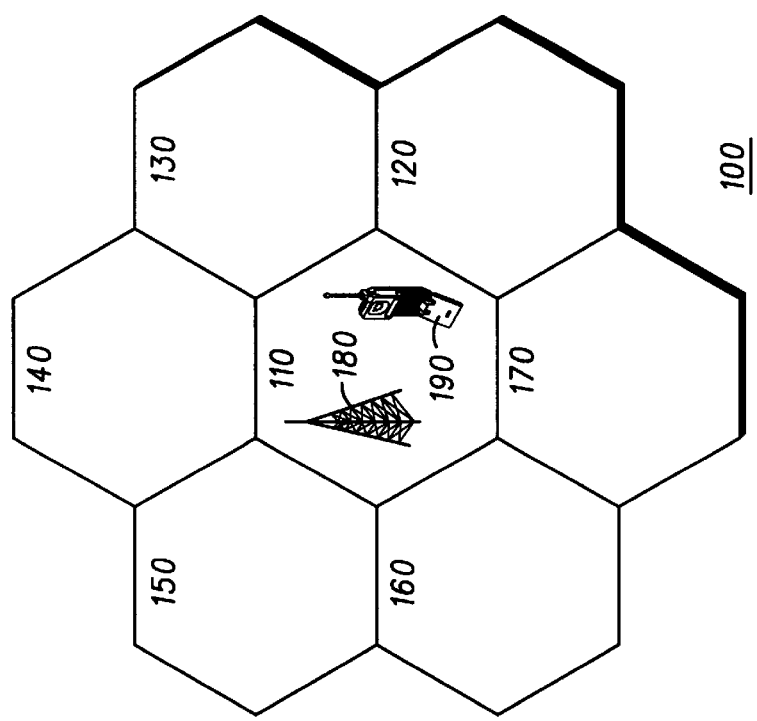
FIG. 1 shows part of a cellular radiotelephone system that uses a seven-cell cell cluster.

The channel scanning method and apparatus uses a priority table to determine the action that should be taken by an MS during an idle frame of a TCH in order to decode the BSIC of each channel in the MS reporting table every ten seconds in accordance with GSM specification 05.08. The priority table can be set to depend on the role of the cell relative to the MS, the time elapsed since the cell's BCH was most recently synchronized, the expected amount of time needed to either detect an FCH or demodulate an SCH, the power level of a BCH, the detected noise level, a multiband reporting parameter and channel number, or other factors. The priority table aids the MS to efficiently use each idle frame and reduce nonuse of idle frames.

The channel scanning method defines two modes: (1) search; and (2) verify. During the search mode, the MS is not synchronized to the target BCH either in the frequency domain or in the time domain, and it must first detect an FCH burst on the selected BCH and then demodulate an SCH burst to decode the BSIC. During the verify mode, the MS is already synchronized to the selected BCH in the frequency domain and the time domain, and the MS only needs to decode the SCH to verify the timing and BSIC of the target base station.

The preferred method uses two types of searches: (1) continuous; and (2) random. During a continuous search, the MS uses up to eleven consecutive idle frames to detect an FCH on a selected BCH. When the MS detects an FCH on the selected channel and the SCH is demodulated, the age of the synchronization status is updated. Although a continuous search may not use TCH idle frames most efficiently, it should find an available FCH on the selected BCH within a predetermined amount of time.

During a random search, idle frames are used to search for an FCH on a selected BCH whenever an idle frame is available for such a search, as determined by the priority table. During a random search, usually fewer than eleven idle frames are consecutively used for a search on a single channel; however, several idle frames are often used consecutively during a random search. If an FCH is detected, the search mode demodulates the SCH and updates the age of synchronization status. If no FCH is detected after a predetermined number of idle frames have been used to randomly search for an FCH on a single BCH, the age of the synchronization status is updated and the search mode does not attempt to demodulate an SCH. A random search is not guaranteed to find an FCH; however, it uses TCH idle frames that otherwise might go unused. The random search reduces the need for continuous searches, which use idle frames less efficiently.

The selected maximum number of idle frames that are used to search for an FCH on a single BCH before the age of the synchronization status is updated can be decided using standard probability equations. The probability P(1) of finding an FCH (if it exists and has adequate power to be detected by the MS) on a selected BCH during a single idle frame is 5/51 because there are five FCH frames in a 51-frame BCH multiframe as shown in FIG. 2. Assuming that successful detections of FCH frames are independent events, then the probability P(N) of finding an FCH (if it exists and has adequate power to be detected by the MS) at least once on the selected BCH after N frames is shown by formula (1) below:

$$P(N)=1-P'(N)=1-(46/51)^N \quad (1)$$

The probability that an FCH will align for the first time with an $N^{th}$ idle frame chosen at random is shown by formula (2) below:

$$(5/51)(46/51)^{N-1} \quad (2)$$

If the random variable X represents the number of idle frames that are used to randomly search for an FCH on a BCH before an FCH is detected, the expected value of X can be computed using formula (3) shown below:

$$\sum_{x=1}^{\infty} x(5/51)(46/51)^{x-1} \quad (3)$$

and is equal to 10.2. If a value of 22 (approximately twice the expected value of X) is selected as the maximum number of idles frames that a random search uses on any one BCH before that BCH's age of synchronization status is updated, the probability of detecting the FCH at least once, using N=22 in formula (1), is 0.89. The number of TCH idle frames that are used in a random search on a BCH before the BCH's age of synchronization status is updated can also be set using the results of empirical methods such as testing, or a combination of probability analysis and testing.

FIG. 5 shows a priority table 500 according to a preferred embodiment. In this priority table 500, the priority of a BCH is determined by its role relative to the MS, the age of synchronization status of the BCH, and whether the BSIC needs to be determined using the search mode or the verify mode. Broadcast channels are first divided into channel groups based on the role of the BCH's cell with respect to the MS. The first channel group 510 contains only the serving cell BCH. The second channel group 520 contains all of the BCHs that are in the reporting table provided to the serving cell base station. According to GSM specifications, there is a minimum of zero BCHs and a maximum of six BCHs in the reporting table. The MS is continuously synchronized in the frequency domain to the BCHs in the first and second channel groups 510, 520. Thus, there is only a verify mode (i.e., no search mode) used with respect to the first and second channel groups 510, 520.

Additional channel groups 530, 540, 550, 560 contain a maximum of thirty-two neighbor cell BCHs in a sorted table according to detected power level, with the strongest signal at sorted table channel 0 and weaker signals entered in descending order. The neighbor cell BCHs are sent by the serving cell base station to the MS in a BCH allocation list. The BCHs in the second channel group 520 will also be found listed in the additional channel groups 530, 540, 550, 560, but the duplicate channels are cross-referenced to the second channel group 520 to prevent conflicting priority determinations.

The priority of the serving cell BCH in channel group 510 is either 15 or 23 depending on the time elapsed since the last update of the age of synchronization status. The age of synchronization status threshold is chosen to achieve the GSM requirement of decoding the BSIC for each channel in the reporting table at least every ten seconds. If the age of synchronization status is greater than the threshold, the priority of the channel in channel group 510 is 23, which is the highest priority. If the age of synchronization status is less than the threshold, the priority of the channel in channel group 510 is 15. Similarly, the priority of a channel in the second channel group 520 is 22 if the age of synchronization status is greater than the threshold or 14 if the age of synchronization status is less than the threshold. The priority assignments are weighted in favor of the serving cell in channel group 510 by making the threshold for channel group 510 less than the thresholds for all other channel groups.

The next four channel groups 530, 540, 550, 560 reference neighbor cells from the BCH allocation list that are not necessarily already synchronized in the frequency domain with the MS. If the MS is not synchronized to the BCH in the frequency domain (e.g., a new channel has been included in the BCH allocation list from the base station), the MS enters the search mode to synchronize with the BCH in the frequency domain. If a neighbor cell BCH is already synchronized with the MS in the frequency domain, then the BSIC contained in the BCH only needs to be verified using the SCH to synchronize in the time domain. In the preferred embodiment, different priorities are assigned to the search mode and the verify mode for a single BCH.

As shown in FIG. 5, if the most recent age of synchronization status update is over the threshold, the priority of decoding the BSIC of an already frequency-synchronized channel in the third channel group 530 is 21 (in verify mode), while the priority of a decoding the BSIC of a new or unsynchronized channel is 20 (in search mode). If the age of synchronization status is less than the threshold, the verify mode priority is 13 while the search mode priority is 17. The priorities for the remainder of the channel groups 540, 550, 560 are similarly arranged, with increasing age of synchronization status thresholds and decreasing priority levels as shown in FIG. 5.

In the preferred embodiment, global priorities 3, 2, 1, and 0 are available for special circumstances. If a BCH has been searched five times before, using either random searches and/or continuous searches, and none of those searches resulted in a verified BSIC, the priority of the channel is 3, regardless of the channel group in which the BCH is presently categorized. When the time elapsed since the last age of synchronization status update equals twice the age of synchronization status threshold, the priority of that BCH returns to the normal priority as determined by the table. If a neighbor cell's BCH has low power, the priority of that BCH is 2 if the age of synchronization status does not exceed twice the age of synchronization status threshold, regardless of the channel group in which the BCH is presently categorized. Low power has been selected as less than the noise floor of the receiver; however, other values can be selected for low power thresholds.

If no priority has been assigned to a channel, that channel's priority is NO PRIORITY, which is equal to one. If an idle frame of the TCH will not align with an FCH on a selected channel in a predetermined amount of time, the priority of the selected channel is NOT ALIGNED PRIORITY, which is equal to a priority of zero and is the lowest priority. The NO PRIORITY and NOT ALIGNED PRIORITY priorities will be explained in detail later.

Another global priority, 24, is available for when a new BCH first appears in the sorted table in channel group 530. A new channel will often appear as one of the strongest-signal channels in the sorted table when a MS travels around the comer of a building or over a hill. This global priority 24 enables a search to be performed on the new BCH right away. Other global priorities can be implemented for special situations such as other strong-power channels or automatic frequency control (AFC) channel updates.

In the priority table, the different channel groups are used to create different priority levels based on age of synchronization status thresholds and whether a BCH needs to be searched or verified. Channel groups are preferably assigned based on a channel's role relative to the MS. For example, the serving cell BCH serves an important role to the MS. Thus, the age of synchronization status threshold is determined to be five seconds, and the priority of the serving cell BCH is the maximum priority above the age of synchronization status threshold, excluding the special global priority. The BCHs in the reporting table also have an important role, but less important than the serving cell BCH, so the age of synchronization status threshold is slightly greater and the priority of the second channel group 520 is slightly lesser than the serving cell BCH. The additional channel groups 530, 540, 550, 560, which are determined based on the signal strength detected by the MS, have decreasing priorities and increasingly greater age of synchronization status thresholds.

Different implementations of the priority table can use different channel groups, different age of synchronization status thresholds, different priority assignments, or additional factors such as multiband reporting parameters. The age of synchronization status threshold could be changed from a single threshold to a sliding scale, thus creating more than two or four priorities per channel group. Variations of the preferred embodiment may eliminate the different priorities for search and verify, or add priorities for modes in addition to search and verify, or replace one or more of the present modes with different modes.

Figure 6:
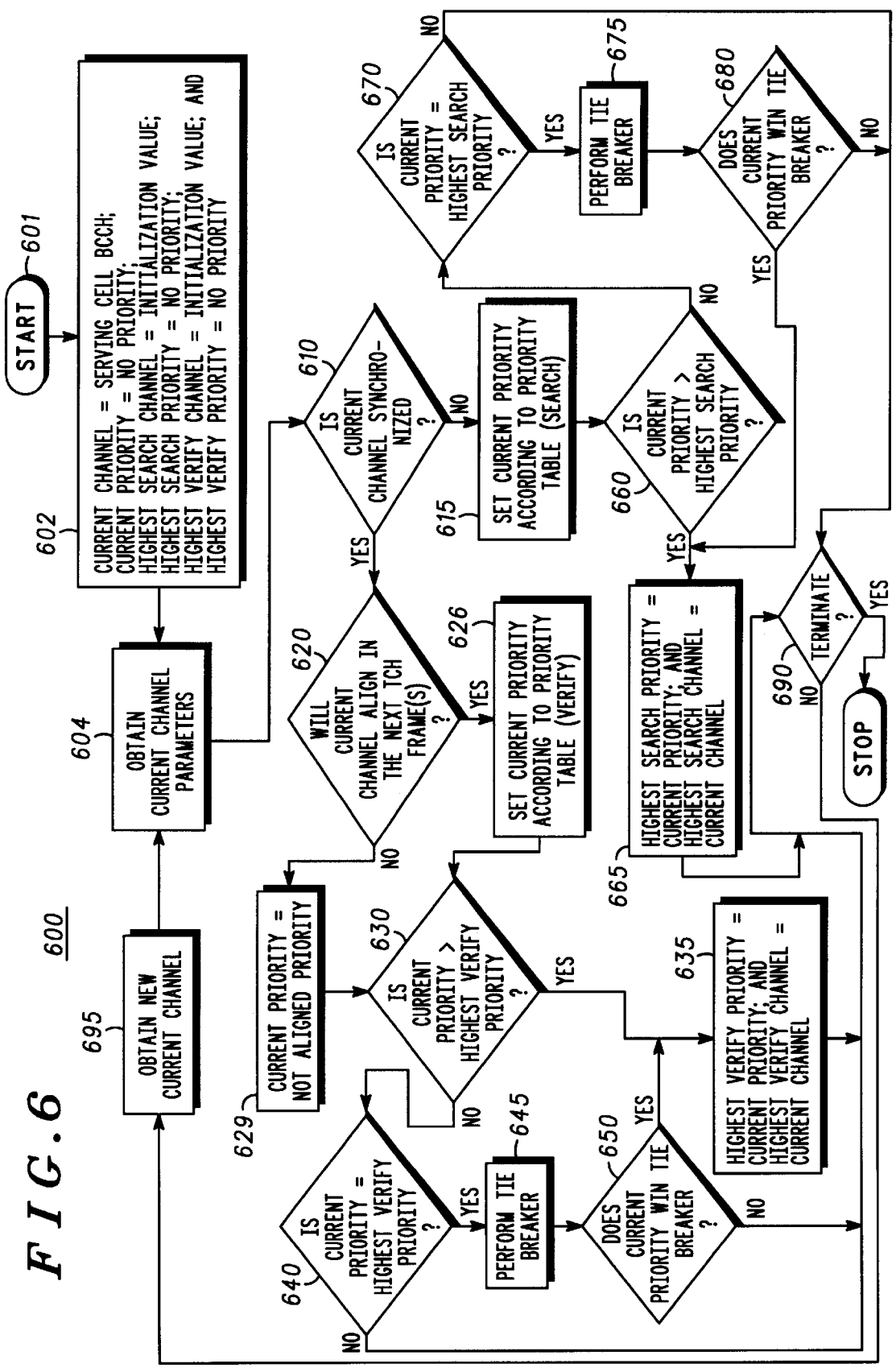
FIG. 6 shows a flow chart of a scheduler according to a preferred embodiment.

The priority table is used by a scheduler that determines the next channel on which the MS should search or verify. The scheduler is preferably implemented in software. FIG. 6 shows a flow chart of a scheduler 600 according to a preferred embodiment. After the start step 601, the initialization step 602 sets a Current Channel variable to the serving cell BCH, which is in channel group 510 shown in FIG. 5, and the associated Current Priority variable to NO PRIORITY, which is equal to one. Additional variables record the highest priority level and the channel associated with that highest priority level for both the search and verify modes. Thus, initialization step 602 also sets the variables for the Highest Search Channel to an initialization value, the Highest Search Priority to NO PRIORITY, the Highest Verify Channel to the initialization value, and the Highest Verify Priority to NO PRIORITY.

In the next step 604, the MS obtains parameters associated with the current channel such as the age of synchronization status, whether the MS is currently synchronized in the frequency domain and the time domain with the BCH, and signal strength. These parameters can be obtained through measurements, computations, or other methods. Decision step 610 determines if the MS is synchronized in both the frequency domain and the time domain with the current channel. If the current channel is fully synchronized, step 620 determines if an idle frame on the TCH will align with an FCH on the current channel within a certain number of TCH frames. The capabilities of the MS, or how long it takes for the MS to decode a BSIC, will assist in determining the number of TCH frames given in step 620. If no idle frame of the TCH will align in the given number of TCH frames, step 629 sets the Current Priority variable to NOT ALIGNED PRIORITY. If an idle frame of the TCH will align in the given number of TCH frames, step 626 sets the Current Priority variable according to the verify portions of a priority table, such as the priority table shown in FIG. 5.

Once the Current Priority variable is set, step 630 compares the Current Priority variable with the Highest Verify Priority variable. If Current Priority is greater than the stored Highest Verify Priority, step 635 sets Highest Verify Priority to Current Priority and sets Highest Verify Channel to Current Channel. If Current Priority is not greater than Highest Verify Priority, step 640 determines if Current Priority is equal to Highest Verify Priority. If the Current Priority variable is equal to the Highest Verify Priority variable, step 645 performs a tie-breaking operation. The tie breaker in the preferred embodiment is dependent upon factors such as the age of synchronization status and the signal strength of the channel.

If in step 650, Current Priority wins the tie, step 635 sets Highest Verify Priority and Highest Verify Channel as previously described. If Current Channel loses the tie breaker, or if Current Priority is neither greater than or equal to Highest Verify Priority, step 690 determines if the algorithm should terminate. If the algorithm should continue, step 695 obtains a new Current Channel and returns to step 604. The scheduler 600 starts with the BCHs in the channel group containing the highest possible priority and sequentially scans through BCHs in the other channel groups in order of decreasing priority. This facilitates terminating the algorithm at the earliest point.

Returning to decision step 610, if the new current channel is not synchronized with the MS, step 615 sets the variable Current Priority according to the search portions of a priority table, such as the priority table shown in FIG. 5. Next, step 660 determines if Current Priority is greater than Highest Search Priority. If Current Priority is greater than Highest Search Priority, step 665 sets Highest Search Priority equal to Current Priority and Highest Search Channel to Current Channel. If Current Priority is not greater than Highest Search Priority, step 670 determines if the two variables are equal. If they are equal, step 675 performs a tie breaker. The tie breaker in search mode also depends on factors such as the age of synchronization status and the signal strength of the channel. If Current Priority wins the tie breaker as determined by step 680, step 665 sets the Highest Search Priority variable to Current Priority and the Highest Search Channel variable to Current Channel. Different tie breaking schemes can be used for search mode and verify mode, although in the preferred embodiment both tie breakers use the same method.

After the Highest Search Priority and the Highest Search Channel variables are set in step 665, or if step 670 determines that Current Priority is not equal to Highest Search Priority, or if step 680 determines that Current Priority does not win the tie breaker, step 690 determines if the algorithm should terminate.

Step 690 determines the algorithm should terminate when all of the BCHs in the priority table have been analyzed and assigned a priority or when the highest available priority has been assigned to a channel. Note that the highest available priority may not always be the highest priority shown in the priority table. For example, if during the first pass through the flow chart, the serving channel BCH priority has been determined to be 15 because the update of the age of synchronization status was less than five seconds ago, the highest available priority is 22. Additionally, if all of the channels in the second channel group 520 shown in FIG. 5 have also been assigned priorities, and none of the channel priorities in that second channel group are set to 22, then the highest available priority is 21.

After the stop step 699 is encountered, the Highest Search Priority is compared to the Highest Verify Priority and the channel associated with the higher priority variable is used by a frequency synthesizer in the cellular radiotelephone so that during the next idle frame, the MS can either search for or verify the BSIC of the given channel.

The alignment decision step 620 helps increase the use of TCH idle frames for high priority tasks. For example, if the scheduler 600 determines that an SCH of the Current Channel will align with a TCH idle frame two idle frames from now, the scheduler can set the Current Priority for two idle frames into the future. The non-aligned next TCH idle frame can also be assigned a priority when the scheduler 600 assigns priorities to other BCHs. If the future task is a high priority, the scheduler will insure that lower priority tasks will be completed before the future, high priority task is scheduled to begin.

This preference for high priority tasks also applies to determining whether a continuous search or a random search is selected. For example, if presently the highest priority action is a search on a particular BCH and the age of synchronization status is less than the given threshold, the scheduler 600 may schedule a continuous search, which can use up to eleven consecutive idle frames. Otherwise, only random searches are allowed.

FIG. 7 shows a simplified hardware block diagram of a cellular radiotelephone or MS 700 according to a preferred embodiment. The MS 700 includes an antenna 705 attached to a transceiver 710. The transceiver 710 includes a variable crystal 720, a call processor 730, a digital signal processor (DSP) 740, and a radio frequency (RF) transmitter and receiver section 750. The scheduler 600 shown in FIG. 6 preferably resides in the call processor 730 and a data bus 733 passes the output of the scheduler, the BCH that requires action during the next TCH idle frame, to the DSP 740. The DSP 740 uses line 743 to control the frequency of the signal from the variable crystal 720 so that the frequency synthesizer in the RF section 750 can acquire the proper BCH and either search or verify as directed. Data from the RF receiver section 750 is passed to the DSP 740 via bus 755 for determination of the BSIC.

Thus, the channel scanning method and apparatus provides a more efficient manner for synchronizing to a BCH and decoding its BSIC. While specific components and functions of the channel scanning method and apparatus are described above, fewer or additional functions could be employed by one skilled in the art within the true spirit and scope of the present invention. For example, Stand-Alone Dedicated Control Channel (SDCCH) multiframes have unused frames similar to the idle frames in a TCH multiframe. The channel scanning method and apparatus can be modified to more efficiently use SDCCH idle frames in the same manner as it more efficiently uses TCH idle frames. The invention should be limited only by the appended claims.

We claim:

1. A channel scanning method for prioritizing scanning of broadcast channels (BCHs) in a cellular radiotelephone system having a mobile station (MS) and plurality of base stations comprising the steps of:

detecting a plurality of BCHs transmitted by the plurality of base stations;

selecting a first BCH from the plurality of BCHs;

determining if the MS is synchronized with the first BCH in both a frequency domain and a time domain; and assigning a first priority to the first BCH if the MS is synchronized with the first BCH in both the frequency domain and the time domain, wherein the first priority is a first verify priority if the MS should enter the verify mode and the first priority is a first search priority if the MS should enter the search mode.

2. A channel scanning method according to claim 1 wherein the step of selecting the first BCH comprises the step of:

choosing a serving cell BCH.

3. A channel scanning method according to claim 1 wherein the step of selecting the first BCH comprises the steps of:

measuring a signal strength for each of the plurality of BCHs; and choosing a BCH having a highest signal strength.

4. A channel scanning method according to claim 1 wherein the step of assigning a first verify priority comprises the step of:

determining whether a time elapsed since the MS was synchronized with the first BCH in a time domain exceeds a predetermined threshold;

assigning a higher priority if the time elapsed exceeds the predetermined threshold; and assigning a lower priority if the time elapsed does not exceed the predetermined threshold.

5. A channel scanning method according to claim 1 further comprising the steps of:

selecting a next BCH, different from the first BCH, from the plurality of BCHs;

determining if the MS is synchronized with the next BCH in both the frequency domain and the time domain; and assigning a first search priority to the next BCH if the MS is not synchronized with the next BCH in both the frequency domain and the time domain.

6. A channel scanning method according to claim 5 further comprising the step of:

assigning a next verify priority to the next BCH if the MS is synchronized with the next BCH in both the frequency domain and the time domain.

7. A channel scanning method according to claim 6 further comprising the step of:

deciding a highest assigned priority from the first verify priority, the first search priority, and the next verify priority; and acquiring an acquired BCH associated with the highest assigned priority.

8. A channel scanning method according to claim 7 further comprising the steps of:

detecting a frequency burst (FCH) on the acquired BCH if the highest assigned priority is a search priority; and demodulating a synchronization burst (SCH) on the acquired BCH if the highest assigned priority is a search priority.

9. A channel scanning method for prioritizing scanning of channels in a cellular communication system comprising the steps of;

selecting a first channel from a plurality of channels;

obtaining first parameters associated with the first channel;

assigning a first priority to the first channel, the first priority selected from a plurality of priorities based on the first parameters, wherein the first priority is a first verify priority if the MS should enter the verify mode and the first priority is a first search priority if the MS should enter the search mode;

selecting the next channel, different from the first channel, from the plurality of channels;

obtaining next parameters associated with the next channel;

assigning a next priority to the next channel, the next priority selected from a plurality of priorities based on the next parameters;

determining which channel is assigned a higher priority; and acquiring an acquired channel wherein the acquired channel is the channel that is assigned the higher priority.

10. A channel scanning method according to claim 9 further comprising the step of:

synchronizing to the acquired channel in a frequency domain and synchronizing to the acquired channel in a time domain if the higher priority is a predetermined search priority.

11. A channel scanning method according to claim 9 further comprising the step of:

synchronizing to the acquired channel in a frequency domain if the higher priority is a predetermined verify priority.

12. A channel scanning method for assisting a mobile station (MS) to obtain a base station identification code (BSIC) in a Global System for Mobile Communications (GSM) digital cellular system comprising the steps of:

selecting a first broadcast channel (BCH);

determining if the MS should enter a verify mode to decode a synchronization burst (SCH) on the first BCH or if the MS should enter a search mode to detect a frequency burst (FCH) on the first BCH;

assigning a first priority to the first BCH wherein the first priority is a first verify priority if the MS should enter the verify mode and the first priority is a first search priority if the MS should enter the search mode;

selecting a next BCH;

determining if the MS should enter a verify mode to decode an SCH on the next BCH or if the MS should enter a search mode to detect an FCH on the next BCH;

assigning a next priority to the next BCH wherein the next priority is a next verify priority if the MS should enter the verify mode and the next priority is a next search priority if the MS should enter the search mode; and acquiring a BCH wherein the acquired BCH is the first BCH if the first priority is higher than the next priority and the acquired BCH is the next BCH if the next priority is higher than the first priority.

13. A channel scanning method according to claim 12 further comprising the step of:

detecting an FCH on the acquired BCH and demodulating an SCH on the acquired BCH to obtain a BSIC if the first search priority or the next search priority is assigned to the acquired BCH.

14. A channel scanning method according to claim 12 further comprising the step of:

demodulating an SCH on the acquired BCH to obtain a BSIC if the first verify priority or the next verify priority is assigned to the acquired BCH.

15. A channel scanning apparatus in a mobile station (MS), having a receiver for receiving broadcast channel (BCH) signals from a serving cell base station and at least one neighbor cell base station, comprising;

a call processor, for appointing a priority for a BCH signal, having:

a scheduler for assigning a priority to the BCH signal using a priority table, the priority table having priority entries for BCHs based on at least one parameter, wherein the assigned priority is a verify priority if the MS should enter the verify mode and the assigned priority is a search priority if the MS should enter the search mode;

a digital signal processor (DSP), coupled to the call processor, for varying signal from a variable crystal to acquire the BCH signal; and a radio frequency (RF) section, coupled to the DSP, for receiving a BCH signal as directed by the DSP.

16. A channel scanning apparatus according to claim 15 wherein the at least one parameter is a signal strength measurement of the BCH signal.

17. A channel scanning apparatus according to claim 15 wherein the at least one parameter is a time elapsed since a most recent synchronization in a time domain of the MS to the BCH signal.

18. A channel scanning apparatus according to claim 15 wherein the at least one parameter is a role of the BCH signal relative to the MS.

19. A channel scanning apparatus according to claim 15 wherein the at least one parameter is a detected noise level of the BCH signal.

* * * * *